United States Patent
Roehm et al.

(10) Patent No.: US 9,764,391 B2
(45) Date of Patent: Sep. 19, 2017

(54) POWER DRILL

(71) Applicant: Robert Bosch GmbH, Stuttgart (DE)

(72) Inventors: Heiko Roehm, Stuttgart (DE); Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 780 days.

(21) Appl. No.: 13/959,939

(22) Filed: Aug. 6, 2013

(65) Prior Publication Data

US 2013/0319707 A1 Dec. 5, 2013

Related U.S. Application Data

(63) Continuation of application No. 12/951,725, filed on Nov. 22, 2010, now Pat. No. 8,528,658.

(30) Foreign Application Priority Data

Dec. 18, 2009 (DE) .......................... 10 2009 054 930

(51) Int. Cl.
*B23B 45/00* (2006.01)
*B23B 31/12* (2006.01)
(Continued)

(52) U.S. Cl.
CPC ........ *B23B 45/008* (2013.01); *B23B 31/1207* (2013.01); *B25B 21/02* (2013.01);
(Continued)

(58) Field of Classification Search
CPC .............................. B25D 16/003; B23B 31/123
(Continued)

(56) References Cited

U.S. PATENT DOCUMENTS 5,569,256 A * 10/1996 Vaughn .............. A61B 17/1633
279/75
6,688,406 B1 2/2004 Wu et al.
(Continued)

FOREIGN PATENT DOCUMENTS

AU 2007200080 7/2008
CN 2280604 5/1998
(Continued)

*Primary Examiner* — Nathaniel Chukwurah
(74) *Attorney, Agent, or Firm* — Norton Rose Fulbright US LLP; Gerard Messina

(57) ABSTRACT

The invention relates to a power drill, having a tool-clamping device that is fastened to a spindle shaft, having a torque clutch that includes an axially movable clutch plate on which an axial force is exerted by a plurality of compression springs that cooperate at least indirectly with an adjusting nut situated on a housing component. The compression springs are accommodated in first recesses embodied in the longitudinal direction of the housing component. A device for axially moving an axial bearing situated on the spindle shaft, is provided at the end of the spindle shaft oriented toward the tool-clamping device. According to the invention, on its side oriented toward the clutch plate, the device for axially moving the axial bearing has at least one actuating section that is situated in a second recess of the housing component and on the side oriented toward the clutch plate, cooperates with an adjusting element for the device.

23 Claims, 3 Drawing Sheets

(51) Int. Cl.
    *B25D 11/10*     (2006.01)
    *B25D 16/00*     (2006.01)
    *B25B 21/02*     (2006.01)

(52) U.S. Cl.
    CPC .......... *B25D 11/106* (2013.01); *B25D 16/003* (2013.01); *B25D 2216/0023* (2013.01); *B25D 2216/0038* (2013.01); *B25D 2222/21* (2013.01); *B25D 2222/24* (2013.01); *B25D 2222/48* (2013.01); *B25D 2222/54* (2013.01); *B25D 2250/065* (2013.01); *B25D 2250/121* (2013.01); *B25D 2250/165* (2013.01); *B25D 2250/205* (2013.01)

(58) Field of Classification Search
    USPC ........ 173/47, 48, 176, 178; 279/60; 408/140
    See application file for complete search history.

(56) References Cited

U.S. PATENT DOCUMENTS

| | | | |
|---|---|---|---|
| 6,691,796 B1 * | 2/2004 | Wu | B25D 16/006 173/109 |
| 7,201,235 B2 | 4/2007 | Umemura et al. | |
| 7,360,607 B2 | 4/2008 | Aeberhard | |
| 7,455,123 B2 | 11/2008 | Aeberhard | |
| 8,528,658 B2 * | 9/2013 | Roehm | B23B 31/1207 173/176 |
| 2004/0231952 A1 | 11/2004 | Nakamura et al. | |
| 2004/0245005 A1 * | 12/2004 | Toyama | B25D 16/003 173/48 |
| 2008/0210450 A1 * | 9/2008 | Spielmann | B25F 5/001 173/178 |
| 2009/0020301 A1 * | 1/2009 | Aeberhard | B25B 21/00 173/176 |

FOREIGN PATENT DOCUMENTS

| | | |
|---|---|---|
| CN | 101318232 | 10/2008 |
| CN | 201223959 | 4/2009 |
| DE | 40 38 502 A1 | 6/1992 |
| DE | 198 49 071 A1 | 5/2000 |
| DE | 10 2004 058 808 A1 | 6/2006 |
| DE | 10 2006 000 545 A1 | 6/2008 |
| JP | 11-285986 | 10/1999 |

* cited by examiner

POWER DRILL

CROSS-REFERENCE TO RELATED APPLICATIONS

The present application is a continuation application of U.S. patent application Ser. No. 12/951,725, filed on Nov. 22, 2010, and claims priority to German Patent Application 10 2009 054 930.7, filed on Dec. 18, 2009, the contents of all of which are hereby incorporated by reference in their entireties.

BACKGROUND OF THE INVENTION

Field of the Invention

The invention relates to a power drill.

Description of the Prior Art

A power drill of this kind is already generally known. The power drill has a torque clutch that makes it possible in particular to also use the drill as a screwdriver. In this operating mode, the torque clutch limits the torque transmitted to the screw to a reasonable quantity. For this purpose, the known power drill has a user-actuated adjusting ring that adjusts the amount of torque that can be transmitted. This adjusting ring moves an adjusting nut, which is situated on a transmission housing and in particular, acts directly on axially situated compression springs that in turn cooperate with an axially movable clutch plate. In this case, the compression springs are guided between threaded segments of the transmission housing on which the adjusting nut is also situated.

In an impact drill, it is also known for the spindle shaft bearing, which is situated at the end oriented toward a tool-clamping unit, to move axially in the impact drilling mode so that the bearing functions as a movable bearing, permitting an impact mechanism to act on the spindle shaft. For this purpose, a device is usually provided, which axially adjoins the torque clutch.

OBJECT AND SUMMARY OF THE INVENTION

Based on the above-indicated prior art, the object underlying the invention is to modify a power drill so that a particularly compact axial design of the power drill is achieved.

According to the invention, a device for axially moving the bearing for the spindle shaft is positioned so that it at least partially overlaps with the device for adjusting the torque of the torque clutch. For this purpose, the device for moving the axial bearing, on its side oriented toward the clutch plate, has at least one actuating section that is situated in a second recess of the housing component, which is particularly embodied as the transmission housing, and on the side oriented toward the clutch plate, cooperates with an adjusting element for the device for moving the axial bearing. In other words, at least one actuating section is situated in the region of the housing component in which the compression springs are also situated.

According to an embodiment of the invention that is particularly advantageous from a structural standpoint, the device has a plurality of strut-like actuating sections that are situated at equidistant angular intervals from one another and the second recesses at least partially accommodate the strut-like actuating sections in a form-locked fashion. This makes it possible to transmit relatively high axial forces, with the guidance provided for the actuating sections also guiding them laterally.

In order to accommodate the actuating sections so as to achieve the axially short overall length, according to another provided embodiment, the adjusting nut has a root circle diameter that is greater than the envelope curve of the installed compression springs and the strut-like actuating sections extend radially inside the root circle diameter of the adjusting nut.

In order to transmit the axial force from the adjusting nut to the compression springs, in a structural modification of the invention, the adjusting nut cooperates with a spring-retaining element that has a section, which protrudes radially inward and cooperates with the compression springs.

In this case, in order to prevent the compression springs from buckling laterally upon exertion of an axial force on the compression springs, and to simultaneously achieve an optimum frictional, nonpositive engagement between the compression springs and the clutch plate, in another advantageous provided embodiment, the inward-protruding section has pin-like extensions, each with a respective compression spring guided on it, and the side of the clutch plate oriented away from the spring-retaining element is provided with force-transmitting means, in particular balls, whose radial distance from the spindle shaft corresponds approximately to the distance of the compression springs from the spindle shaft.

To immobilize the clutch device, particularly during impact drilling mode, so as to enable a particularly good introduction of force from the adjusting nut to the clutch plate, another embodiment of the invention includes the provision that the spring-retaining element has at least one support section that is aligned with the adjusting nut in the axial direction and rests against the clutch plate in order to immobilize the coupling plate in the axial direction.

In order to minimize the number of components used and thus to enable an optimum design of the power drill from a production engineering standpoint, according to another advantageous embodiment, the housing component is a transmission housing.

In this case, the transmission housing is relatively convenient to produce from a production engineering standpoint if it is embodied in the form of a pressure die-cast part composed of metal (e.g. aluminum, magnesium, or zinc) or a pressure die-cast part composed of plastic.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
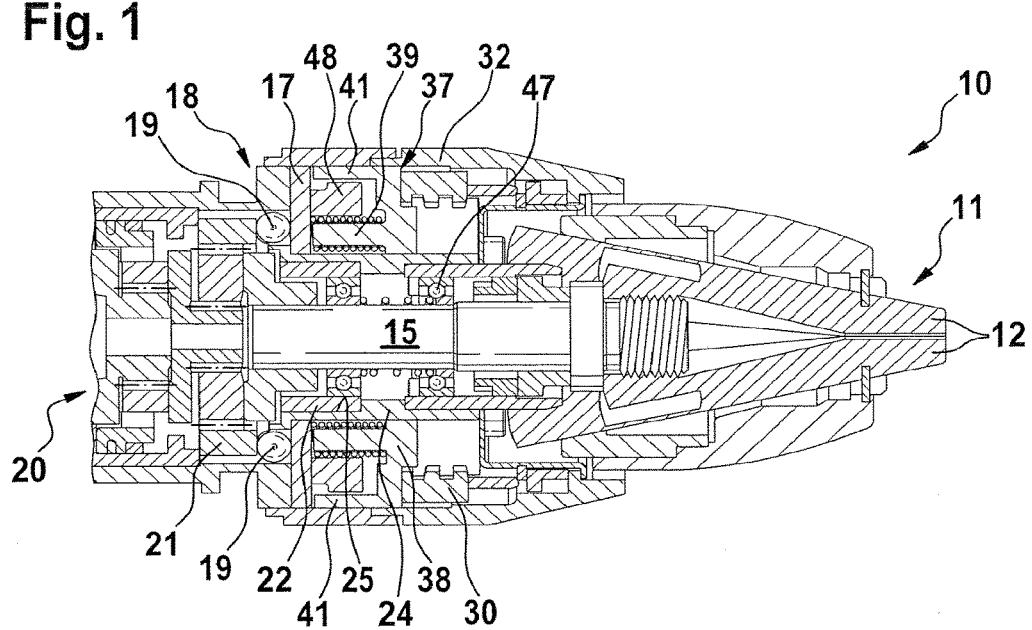
FIG. 1 is a longitudinal section through the front part of a power drill according to the invention in a first sectional plane.
Figure 2:
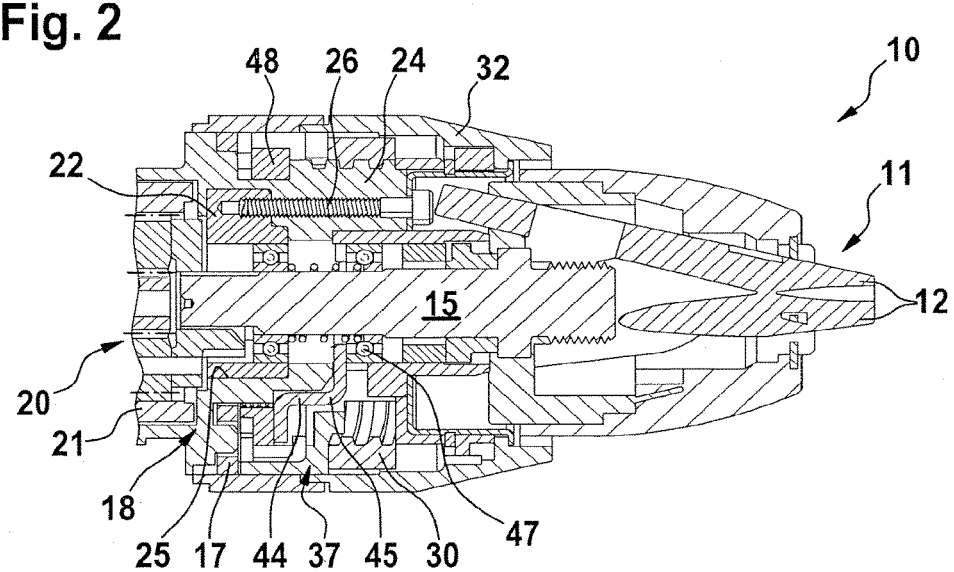
FIG. 2 is a longitudinal section through the front part of a power drill according to the invention in a second different sectional plane than in FIG. 1.

FIGS. 1 and 2 show the axial front part of a power drill 10 according to the invention. The power drill 10 is in particular embodied as a cordless drill and has an impact drilling function as well as a screwdriving and drilling function. The power drill 10 has a tool-clamping device 11 that in a known way, includes in particular three clamping jaws 12 arranged at equidistant angular intervals from one another. The clamping jaws 12 can be opened and closed in a known way in order to accommodate a suitable tool such as a drill bit or screwdriving bit between the clamping jaws 12.

The tool-clamping device 11 is fastened to the end of a spindle shaft 15 oriented toward it. The other end of the spindle shaft 15 oriented away from the tool-clamping device 11 is operatively connected to a clutch plate 17, with the clutch plate 17 situated in an axially movable fashion. The clutch plate 17 is a component of a torque clutch 18, which has a plurality of balls 19, preferably six of them, which are situated at equidistant angular intervals from one another on the side of the clutch plate 17 oriented away from the tool-clamping device 11. The balls 19 are operatively connected to a detent sleeve 21 that is connected to an output gear of an in particular multi-stage transmission 20 of the power drill 10, preferably embodied in the form of a planetary gear set. The transmission 20 is in turn connected to the drive motor of the power drill 10 (not shown).

The spindle shaft 15 is encompassed, with an interposed bearing, by a clamping ring 22, which is in turn radially encompassed by a transmission housing 24. For this purpose, the transmission housing 24, as is particularly visible in FIGS. 1 and 2, has a recess 25 on the inside so that the transmission housing 24 can be connected to the clamping ring 22 by means of fastening screws 26 that extend through the transmission housing 24 in through bores. It should also be noted that the clutch plate 17 is guided radially in the transmission housing 24.

The transmission housing 24 is in particular embodied in the form of a pressure die-cast part composed of metal (e.g. aluminum, magnesium, or zinc) or a pressure die-cast part composed of plastic. As is depicted the most clearly in FIGS. 3 through 5, the end of the transmission housing 24 oriented toward the tool-clamping device 11 is provided with a threaded section 27 that has three threaded struts 28 situated at equidistant angular intervals from one another. The threaded struts 28 with their external thread 29 serve to fasten and axially guide an adjusting nut 30 (see FIGS. 1, 2, and 4). The adjusting nut 30 is likewise a component of the torque clutch 18; it cooperates with an adjusting ring 32 and can be actuated by means of it. As is depicted most clearly in FIGS. 3 through 5, the transmission housing 24 has first recesses 33 extending in the longitudinal direction of the transmission housing 24, in which a number of compression springs 35 in particular corresponding to the number of balls 19, i.e. six compression springs 35 in the exemplary embodiment, are situated at equidistant angular intervals from one another. The compression springs 35 and the balls 19 are advantageously arranged so that they are aligned with one another when the detent sleeve 21 of the torque clutch 18 is not slipping. In this case, viewed in the radial direction, the compression springs 35 all extend inside the root circle of the external thread 29 of the transmission housing 24 and are spaced apart from the spindle shaft 15 by approximately the same radial distance as the balls 19. The one end of each compression spring 35 acts on the clutch plate 17. An axial force is exerted on the compression springs 35 by means of a spring-retaining element 37 that is coupled to the adjusting nut 30. For this purpose, the spring-retaining element 37, as shown in FIG. 1, has a section 38 protruding radially inward, which has a pin-like extension 39 for each compression spring 35. Each extension 39 accommodates and guides a respective compression spring 35. Aligned with the adjusting nut 30, the spring-retaining element 37 also preferably has a plurality of support regions 41 situated at equidistant angular intervals from one another, which extend parallel to the extensions 39 and rest against the clutch plate 17 when the clutch plate 17 is in an immobilized position.

Figure 3:
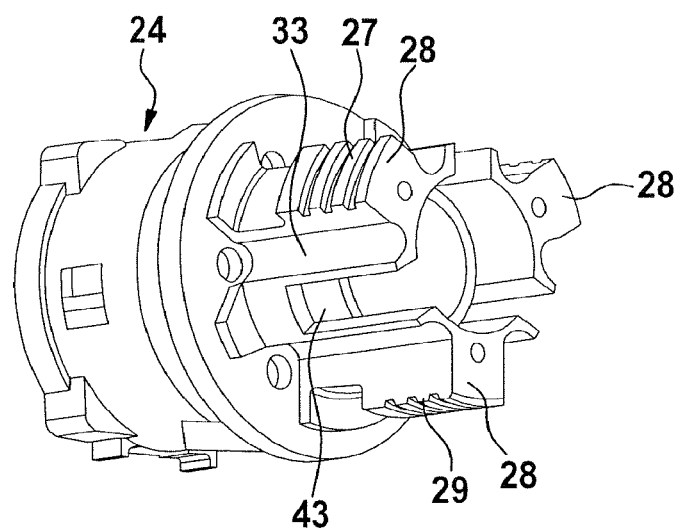
FIG. 3 is a perspective view of the front part of a transmission housing.
Figure 4:
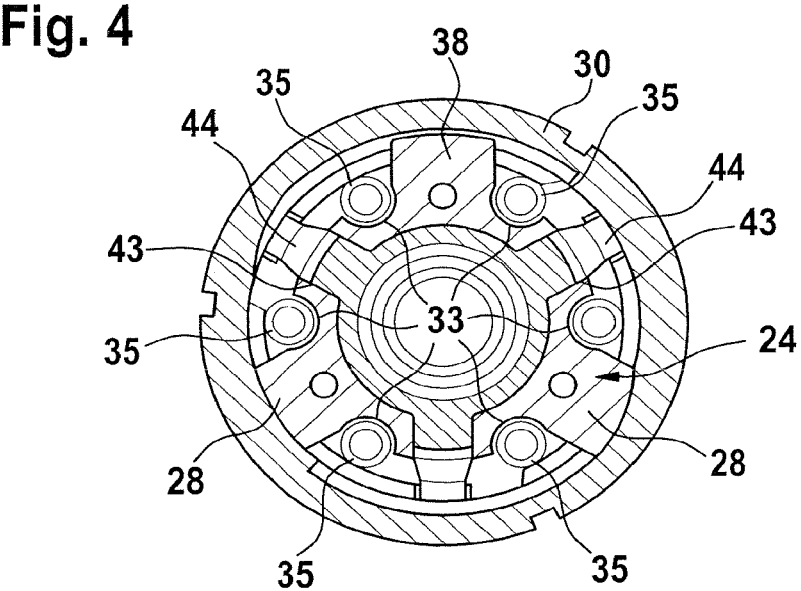
FIG. 4 is a cross-section through the power drill according to FIGS. 1 and 2, in the vicinity of the transmission housing.

In addition to the first recesses 33, the transmission housing 24 has second recesses 43. The second recesses 43, which are depicted most clearly in FIGS. 3 and 4, are likewise situated at equidistant angular intervals from one another in the transmission housing 24 and in particular, are embodied as groove-shaped. The second recesses 43 serve to at least partially accommodate strut-like actuating sections 44 in a form-locked fashion.

The actuating sections 44 are components of a bearing holder 45 (FIGS. 1 and 2) that is provided to axially move an axial bearing 47. The axial bearing 47 in this case is situated at—and provides guidance for—the end of the spindle shaft 15 oriented toward the tool-clamping device 11. The ends of the actuating sections 44 oriented away from the axial bearing 47 rest against a cam ring 48 that functions as an adjusting element and is likewise coupled to the adjusting ring 32, particularly in a form-locked fashion. In this case, the cam ring 48 is used to axially move the actuating sections 44 and bearing holder 45 so that the axial bearing 47 functions as a movable bearing for the impact drilling mode of the power drill 10 and functions as a fixed bearing for the screwdriving and drilling modes.

Figure 5:
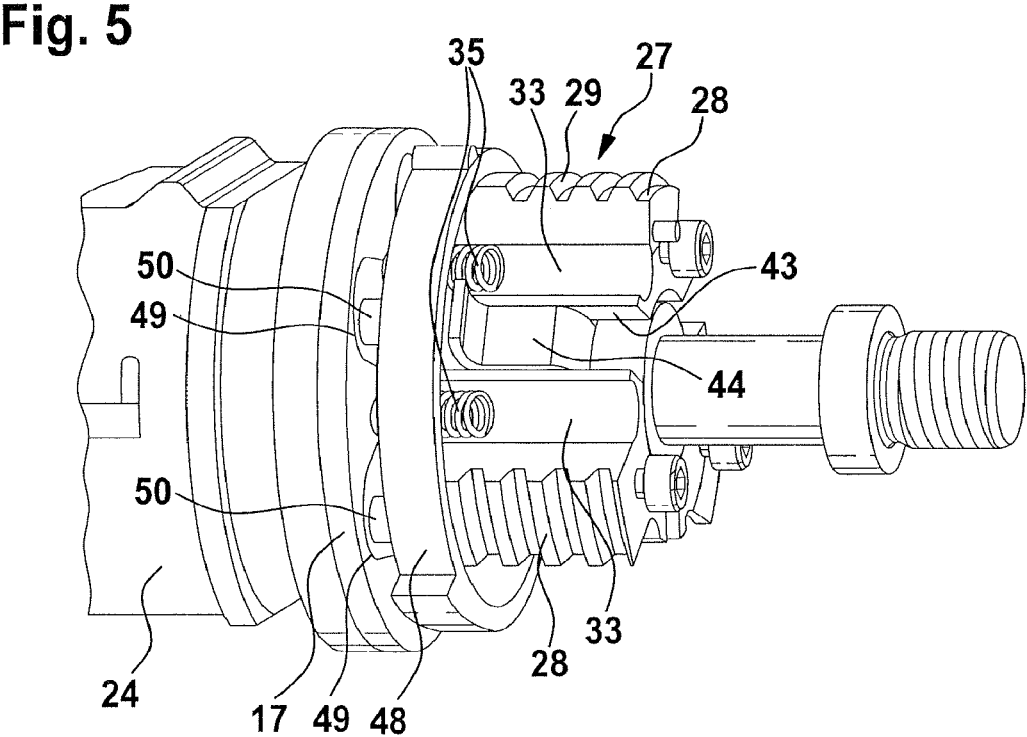
FIG. 5 is a perspective depiction of the region of the front transmission housing, with various parts not depicted for the sake of clarity.

In drilling mode, as shown in FIG. 5, the bearing holder 45 rests with its actuating sections 44 axially against the transmission housing 24 via the cam ring 48; for this purpose, the clutch plate 17 has recesses 49 so that spacer elements 50 formed onto the cam ring 48 can cooperate with the transmission housing 24. In order to increase the transmittable torque, the adjusting ring 32 is rotated so that the adjusting nut 30 is moved axially in the direction of the clutch plate 17. As a result, the compression springs 35 exert an increased axial compressive force against the clutch plate 17 via the spring-retaining element 37.

In the drilling mode of the power drill 10, the support regions 41 and/or the extensions 39 in turn press the clutch plate 17 until it is virtually locked in place, thus immobilizing the torque clutch 18.

The foregoing relates to preferred exemplary embodiments of the invention, it being understood that other variants and embodiments thereof are possible within the spirit and scope of the invention, the latter being defined by the appended claims.

The invention claimed is:

1. A power drill, comprising:
   a spindle shaft;
   a tool holder;
   a torque clutch including an axially movable clutch member and at least one spring member which exerts an axial force on the clutch member;
   a first adjusting element configured to adjust the axial force exerted by the at least one spring member on the clutch member;
   wherein the first adjusting element has a root circle diameter which is greater than an envelope curve of the at least one spring member,
   wherein the at least one spring member is situated at least partially between the clutch member and the first adjusting element.

2. A power drill as defined in claim 1, wherein the first adjusting element is arranged on a housing component.

3. A power drill as defined in claim 2, wherein the housing component has at least one first recess in a longitudinal direction of the housing component, the first recess being configured to accommodate the at least one spring member.

4. A power drill as defined in claim 1, comprising an axial bearing situated on and providing guidance for the spindle shaft.

5. A power drill as defined in claim 4, comprising a device for axially moving the axial bearing, said device having at least one actuating member which is accommodated in at least one second recess in a longitudinal direction of the housing component.

6. A power drill as defined in claim 5, wherein the at least one actuating member are arranged radially inside the root circle diameter of the adjusting element.

7. A power drill as defined in claim 5, wherein the device for axially moving the axial bearing further comprises a first end oriented towards the axial bearing.

8. A power drill as defined in claim 5, wherein the device for axially moving the axial bearing further comprises a second end oriented away from the axial bearing towards the clutch member.

9. A power drill as defined in claim 5, comprising a second adjusting element configured to adjust the device for axially moving the axial bearing such that the axial bearing is at least one of a) movable during impact drilling of the power drill, and/or b) fixed during screwdriving and/or drilling of the power drill.

10. A power drill as defined in claim 9, wherein the second adjusting element is configured to cooperate with the second end of the device for axially moving the axial bearing.

11. The power drill as defined in claim 5, wherein the at least one second recess is offset in a circumferential direction relative to the at least one first recess.

12. A power drill as defined in claim 1, comprising a spring-retaining element configured to retain the at least one spring element, said spring-retaining element has a section that protrudes radially inward.

13. A power drill as defined in claim 12, wherein the radially inwardly protruding section has at least one pin-like extension for guiding the at least one spring member thereon.

14. A power drill as defined in claim 12, wherein the first adjusting element cooperates with the spring-retaining element to adjust the axial force exerted by the at least one spring element on the clutch member.

15. A power drill as defined in claim 12, wherein the spring-retaining element has at least one support section configured to rest against the clutch member for blocking movement of a clutch plate in an axial direction during impact drilling of the power drill.

16. A power drill as defined in claim 1, wherein the torque clutch comprises at least one force-transmitting element, in particular balls, said at least one force-transmitting element is arranged at a radial distance from the spindle shaft which is substantially the same radial distance of the at least one spring element from the spindle shaft.

17. A power drill as defined in claim 16, wherein the number of force-transmitting elements corresponds to the number of spring elements and the force-transmitting elements are aligned with the spring elements when the torque clutch is not slipping.

18. A power drill as defined in claim 1, wherein the tool holder is embodied as a tool-clamping device that is fastened to the spindle shaft.

19. A power drill as defined in claim 1, wherein the clutch member is embodied as a clutch plate.

20. A power drill as defined in claim 1, wherein the at least one spring member is embodied as a compression spring.

21. A power drill as defined in claim 1, wherein the at least one actuating member is embodied as a strut-like actuating member.

22. A power drill as defined in claim 1, wherein a plurality of strut-like actuating members are provided at equidistant angular intervals from one another and each of the plurality of strut-like actuating members are accommodated in one of a plurality of second recesses in the housing component.

23. A power drill as defined in claim 1, wherein the housing component is embodied as a transmission housing.

\* \* \* \* \*